(12) United States Patent
Brant et al.

(10) Patent No.: US 10,390,500 B2
(45) Date of Patent: Aug. 27, 2019

(54) DESALINATION MEMBRANES FOR SUBSURFACE IRRIGATION

(71) Applicant: KC Harvey Environmental, LLC, Bozeman, MT (US)

(72) Inventors: Jonathan A. Brant, Laramie, WY (US); Kevin Harvey, Bozeman, MT (US)

(73) Assignee: KC HARVEY ENVIRONMENTAL, LLC, Bozeman, MT (US)

( * ) Notice: Subject to any disclaimer, the term of this patent is extended or adjusted under 35 U.S.C. 154(b) by 59 days.

(21) Appl. No.: 15/289,800

(22) Filed: Oct. 10, 2016

(65) Prior Publication Data

US 2017/0150685 A1   Jun. 1, 2017

Related U.S. Application Data

(60) Provisional application No. 62/239,565, filed on Oct. 9, 2015.

(51) Int. Cl.
*A01G 25/00* (2006.01)
*B01D 61/36* (2006.01)
(Continued)

(52) U.S. Cl.
CPC ........... *A01G 25/00* (2013.01); *B01D 61/362* (2013.01); *B01D 61/366* (2013.01); *B01D 65/08* (2013.01);
(Continued)

(58) Field of Classification Search
CPC .... B01D 61/36; B01D 61/362; B01D 61/366; B01D 61/368; B01D 61/145; B01D 2325/04; B01D 2325/36; B01D 65/08; B01D 69/04; B01D 69/14; B01D 71/14; B01D 71/16; B01D 71/38; B01D 71/56; C02F 1/448; C02F 2103/10; A01G 25/00
See application file for complete search history.

(56) References Cited

U.S. PATENT DOCUMENTS

| | | | |
|---|---|---|---|
| 2002/0130078 A1* | 9/2002 | Tonkin | A01G 27/006 210/640 |
| 2011/0042315 A1* | 2/2011 | Parnas | B01D 61/362 210/640 |
| 2012/0061319 A1* | 3/2012 | Vandezande | B01D 67/0079 210/640 |

OTHER PUBLICATIONS

Huang et al.; Pervaporation dehydration of aqueous ethanol and isopropanol mixtures through alginate/chitosan two ply composite membranes supported by poly(vinylidene fluoride) porous membrane; Journal of Membrane Science 167 (2000) 275-289. (Year: 2000).*
Liu et al.; Polymer/Ceramic Composite Membranes and Their Application in Pervaporation Process; Chinese Journal of Chemical Engineering, 20(1) 62-70 (2012). (Year: 2012).*
Quinones-Bolanos et al.; Water and solute transport in pervaporation hydrophilic membranes to reclaim contaminated water for micro-irrigation; Journal of Membrane Science 252 (2005) 19-28. (Year: 2005).*

(Continued)

*Primary Examiner* — Pranav N Patel
(74) *Attorney, Agent, or Firm* — Marsh Fischmann & Breyfogle LLP; Russell T. Manning (57) ABSTRACT

Presented herein are membranes for use in separating solids including salts from water. One application of such membranes is in a sub-surface irrigation system that that utilizes a saline or tainted water as a feed source. In various embodiments, the membranes operate on a solution diffusion principle. In other embodiments the membranes operate on an ultrafiltration principle and/or a solution diffusion principle. In any embodiment, the membranes operate similar to pervaporation membranes suitable for non-pressure driven systems. The membranes are designed to provide increased flux rate while separating solids such as salts from water.

20 Claims, 10 Drawing Sheets

(51) Int. Cl.
*B01D 69/04* (2006.01)
*B01D 69/12* (2006.01)
*C02F 1/44* (2006.01)
*B01D 65/08* (2006.01)
*B01D 71/16* (2006.01)
*B01D 71/38* (2006.01)
*B01D 71/56* (2006.01)
*B01D 69/14* (2006.01)
*B01D 71/14* (2006.01)
*C02F 103/10* (2006.01)
*B01D 61/14* (2006.01)

(52) U.S. Cl.
CPC ............ *B01D 69/04* (2013.01); *B01D 69/14* (2013.01); *B01D 71/14* (2013.01); *B01D 71/16* (2013.01); *B01D 71/38* (2013.01); *B01D 71/56* (2013.01); *C02F 1/448* (2013.01); *B01D 61/145* (2013.01); *B01D 2325/04* (2013.01); *B01D 2325/36* (2013.01); *C02F 2103/10* (2013.01)

(56) References Cited

OTHER PUBLICATIONS

Quinones-Bolanos et al.; Membrane Pervaporation for Wastewater Reuse in Microirrigation; Journal of Environmental Engineering, vol. 131, No. 12, Dec. 1, 2005, 1633-1643. (Year: 2005).*

Quiñones-Bolaños et al.; Modeling Water Movement and Flux from Membrane Pervaporation Systems for Wastewater Microirrigation, Journal of Environmental Engineering, vol. 132, No. 9, Sep. 1, 2006, 1011-1018. (Year: 2006).*

Xia et al.; Dehydration of ethyl acetate-water mixtures using PVA/ceramic composite pervaporation membrane; Separation and Purification Technology 77 (2011) 53-59. (Year: 2011).*

Todman et al.; Water vapor transport in soils from a pervaporative irrigation sysetm; Journal of Enironmental Engineering/vol. 139 ISsue 8, Aug. 2013, pp. 1-27 (Year: 2013).*

\* cited by examiner

DESALINATION MEMBRANES FOR SUBSURFACE IRRIGATION

CROSS REFERENCE

The present application claims the benefit of the filing date of U.S. Provisional Application No. 62/239,565 having a filing date of Oct. 9, 2015, the entire contents of which is incorporated herein by reference.

FIELD

The present disclosure is directed membranes and their use to selectively separate dissolved solids, including salts, from water. The membranes are useful in at least partially purifying water which may contain suspended or dissolved impurities and solids, including but not limited to seawater, unaltered groundwater and surface water naturally enriched with salts, industrial wastewater tainted with salts, and produced water from oil and natural gas extraction.

BACKGROUND

Wastewater as well as un-altered waters characterized by high salt concentrations (>1,000 mg/L) are generally referred to as saline water. Highly saline wastewaters are generated in an array of industrial applications including during the exploration for and production of oil and natural gas resources from subsurface formations. Management of produced waters from oil and gas production is receiving growing scrutiny as the volumes that are now being generated in the United States alone are approaching 20 to 30 billion barrels per year. Produced waters can have total dissolved solids concentrations ranging from thousands to several hundred thousand mg/L. Two common methods of managing such brine waters are deep-well injection and evaporation ponds. Both of these approaches are disposal techniques and not considered as treatment processes nor are they beneficial uses.

The rapid growth of the world's population continues to place stress on our finite and limited freshwater resources. This stress has led stakeholders to seek out ways to reduce the amounts of freshwater that are used in industrial and agricultural systems. Agricultural activities are particularly targeted because they generally represent the largest consumer of freshwater in many states. For example crop irrigation is the single largest use (39% of total) of fresh water in the United States. To meet this challenge many are turning to the reuse of 'impaired' waters or waters naturally enriched with salts for irrigation of non-food based crops and vegetation. The paradigm has shifted from considering these effluent streams as 'waste' to now seeing them as a valuable resource. Realizing the possibility of reusing brine flows for some beneficial purpose requires that the existing challenges associated with desalination processes be overcome and overcome in a manner that is cost effective and practically feasible.

Along these lines, a number of water purification processes are utilized. Processes for the purification of water are sometimes classified as filtration, distillation or osmosis. In filtration processes, impurities in particulate form are removed using porous constructions or filters. In cases where very small particles must be filtered, polymer membranes are used which are microporous, that is, the membranes have very small holes through which the particulates to be filtered cannot pass. However, filtration processes are not utilized for desalination.

Aqueous solutions containing dissolved salts (e.g., brine streams) are usually purified (desalinated) by ion exchange, pressure driven membrane processes (e.g., nano-filtration, reverse osmosis) non-pressure driven membrane processes (forward osmosis, membrane distillation), mechanical distillation, and crystallizers. While effective, these technologies are highly energy intensive and require extensive infrastructure.

Another process for desalinating water is pervaporation. Pervaporation (or pervaporative separation) is a processing method for the separation of mixtures of liquids by partial vaporization through a non-porous membrane. This process can be non-pressure driven and therefore requires significantly less energy input than the prior discussed technologies. Pervaporation membranes separate aqueous solutions based on differing rates of diffusion and solubility into a typically non-porous membrane, followed by an evaporative phase change. Water transport across a pervaporation membrane occurs in three steps—attachment to the membrane surface on the interior side (i.e., feed side) of the membrane, followed by diffusion into and across the membrane and a final step in which permeate (vapor) desorbs from the opposing side (e.g., permeate side) of the membrane. The primary driving force for pervaporation is the partial pressure difference of the permeating component between the feed and permeate sides of the membrane.

SUMMARY

Presented herein are membranes that may be utilized to separate solids including salts from water. One non-limiting application of such membranes is in a sub-surface irrigation system that that utilizes a saline or tainted water as a feed source. In various embodiments, the membranes operate on a solution diffusion principle. In other embodiments the membranes operate on an ultrafiltration principle and/or a solution diffusion principle. In any embodiment, the membranes operate similar to pervaporation membranes suitable for non-pressure driven systems. More importantly, the membranes are designed to provide increased flux rate while separating solids such as salts from water.

In one aspect, a membrane is provided that is formed of a matrix material that includes a plurality of nanoparticles which increase the flux rate of the membrane and/or increase the mechanical strength of the membrane allowing for reducing the thickness of the membrane, which further increases its flux rate. The matrix material and nanoparticles define an active layer of the membrane that is utilized to separate solids/salts from water. That is, water is able to pass through the active layer of the membrane while solids/salt are prevented from passing through the active layer. In various embodiments, the membrane may be formed entirely of an active layer. In such an arrangement, the active layer is typically between about 200 μm and 1 mm thick. In other embodiments, the active layer is disposed on a porous support layer. When an active layer disposed on a porous support layer, the thickness of the active layer of the membrane may be significantly reduced. Such reduction in thickness of the active layer increases the flux rate of the membrane. When utilizing a porous support layer, the active layer may be as thin as about 10 nm. Typically, the matrix is a hydrophilic material that allows water to diffuse into the matrix. However, other embodiments utilize hydrophobic matrix materials.

Inclusion of the nanoparticles within the matrix of the active layer of the membrane provides a number of benefits. In one arrangement, the nanoparticles have a high aspect ratio (i.e., length to width). In such an arrangement, the nanoparticles act as reinforcing fibers for the matrix. Such reinforcement allows the active layer/matrix to be thinner further increasing its flux rate. In one arrangement, the nanoparticles are nanotubes. In one arrangement, the nanotubes are randomly dispersed within the matrix similar to a fibrous mat. In such an arrangement, the nanotubes may have a length between 10 nm and 200 µm. Further, such nanotubes may have a throat or pore diameter between about 1 nm and 10 nm. When the nanotubes are disposed in the matrix in a mat, some water is able to diffuse through the interiors of the nanotubes. In another arrangement, the nanotubes are aligned. In this regard, substantially rigid nanotubes may be aligned to extend between first and second surfaces of the matrix. In such an arrangement, the throats of the nanotubes define a pathway through the matrix. Other nanoparticles may be utilized. The nanoparticles include, without limitation zeolite, silica and/or metal oxides.

The amount of nano-particles disposed within the matrix may be varied to provide desired qualities to a resulting membrane. Typically, the nano-pariticles will be present in at least 1-3% by weight of the resulting membrane. Higher concentrations are possible. The nano-particles may form 10% or more of the surface area of the resulting membrane.

When utilizing nanotubes, the interiors of the nanotubes may be coated with a hydrophobic material to enhance passage of water vapor through the interior of the nanotubes. When utilizing larger diameter nanotubes, an end of the nanotube on the feed side of the membrane may be coated with a hydrophobic material prevent percolation of liquid water and dissolved materials through the throat of the nanotubes. In a further arrangement, the ends of the aligned nanotubes may be coated with a cation selective material to allow cations to pass through the nanotubes while preventing anions from passing through the nanotubes.

When utilizing a porous support layer, the porous support layer may have a nominal pore diameter of less than about 0.8 microns to prevent liquid water from entering into the active layer of the membrane from the permeate side.

In another aspect, a method for producing a nanocomposite membrane is provided. The method includes attaching acceptor or donor molecules to the ends of a plurality of nanotubes having a substantially common length. The other of donor for acceptor molecules are attached to a templated surface in a desired pattern. The templated surface is then flooded with a solvent into which the nanotube are released. After predetermined time, the acceptors or donors of the nanotubes attach to the donors or acceptors of the templated surface. This creates a forest of aligned nanotubes. At this time, the solvent is exchanged with a liquid polymer which is then allowed to cure. Once cured an active layers form having a plurality of aligned nanotubes that extend through the cured polymer.

In any of the above aspects, imogolite nanotubes may be utilized. Further, the active layers and or support layers may be formed into tubing. Such tubing may be utilized for, among other things, subsurface irrigation systems.

In another aspect, a method is provided for designing a subsurface irrigation system that utilizes a saline or tainted water as a feed source. The method includes providing pervaporation type membrane tubes that are buried within the soil. The membrane tubes typically have a thin composite active layer formed of a matrix material (e.g. hydrophilic) and nanoparticles. Typically, these membrane tubes are supported by a macro-porous support layer. Tainted water is circulated through the buried membrane tubes, typically under low pressure though this is not a strict requirement. The tubes reject salts and other contaminants to provide water to the soil. A combination of the difference in pressure heads between the water inside the membrane tubes, the soil matric potential, and a difference in vapor pressure between the soil and feed water inside the tubular membrane, the evapotranspiration of crops being supplied with water and the flux rate(s) of the membrane tubes dictate the size and spacing of the buried tubes.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1:
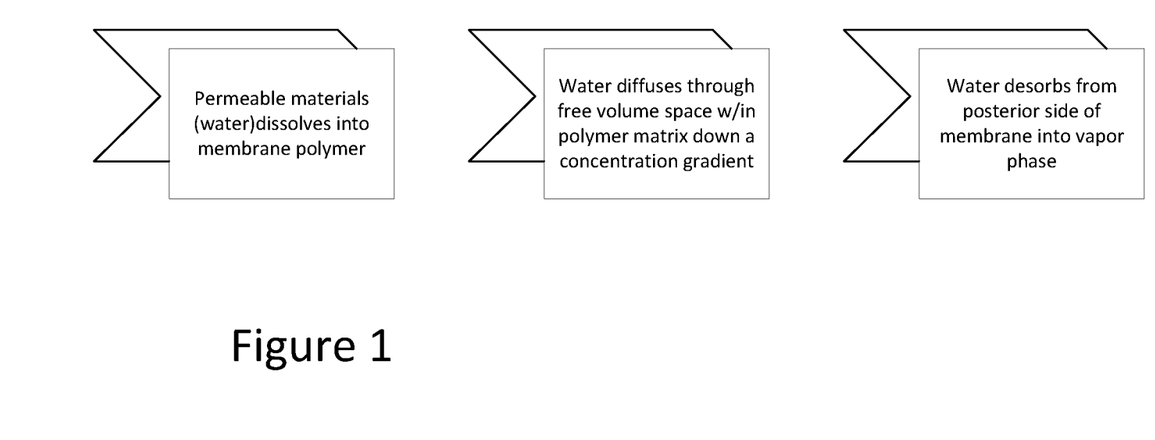
FIG. 1 illustrates a pervaporation process.

Pervaporation is a membrane based separation process that involves the separation of mixtures based on differing rates of diffusion and solubility in a non-porous membrane, followed by an evaporative phase change. Pervaporative water transport across a membrane occurs in three steps—attachment of solvent to the membrane surface (i.e., feed side), followed by diffusion of solvent across the membrane and a final step in which permeate (vapor) desorbs from the posterior side (i.e. permeate side) of the membrane (FIG. 1). Separation occurs because different materials permeate through the membranes at different rates. The driving force for pervaporation is the partial pressure difference of the permeating component between the feed and permeate sides of the membrane. That is, one or more gradients (e.g., vapor, osmotic, salt etc.), between the feed and permeate sides of the membrane, drive the process.

Pervaporation can be utilized for treating high salinity brines (pervaporation desalination). In such an arrangement, water is transported across a semi-permeable membrane substantially free of salts. Salt rejection occurs through the differences in solubility and diffusion rates between the water molecules and salts. Obtaining desalinated water from a feedstock of naturally saline or tainted water provides water for, among other things, agricultural uses (e.g., irrigation of a crop).

One application of pervaporative desalination disclosed by the present application is Subsurface Desalination Irrigation (SDI). In an SDI system, pervaporative membranes are placed beneath the soil surface between a feed source of saline water and the soil root zone. The pervaporation membranes provide water (e.g., vapor or condensate) directly to the root systems of cropped or natural vegetation. For such an application, the pervaporation membrane is hydrophilic while also rejecting salts so that they cannot pass into the soil. The membranes are "hydrophilic" meaning that the membranes are non-porous, absorb water, and allow the absorbed water to pass through. The membranes are considered as being non-porous, in the traditional sense of the word used by membrane scientists, in that any opening through the membrane is generally less than about 10 nanometers (nm). Such a spacing is roughly the distance between polymer chains in polymeric materials forming the membrane.

The vapor/condensate passing into the soil is evaporated directly from the soil or is taken up by the plant roots and transpired through the plant stomata into the atmosphere which aids in maintaining a low vapor pressure on the permeate side of the membrane. This in turn maintains water transport across the pervaporation membrane. The dual benefits of this approach of treating a saline enriched feedstock is that the volume of waste water requiring disposal is reduced and water is provided for crop growth.

Figure 2:
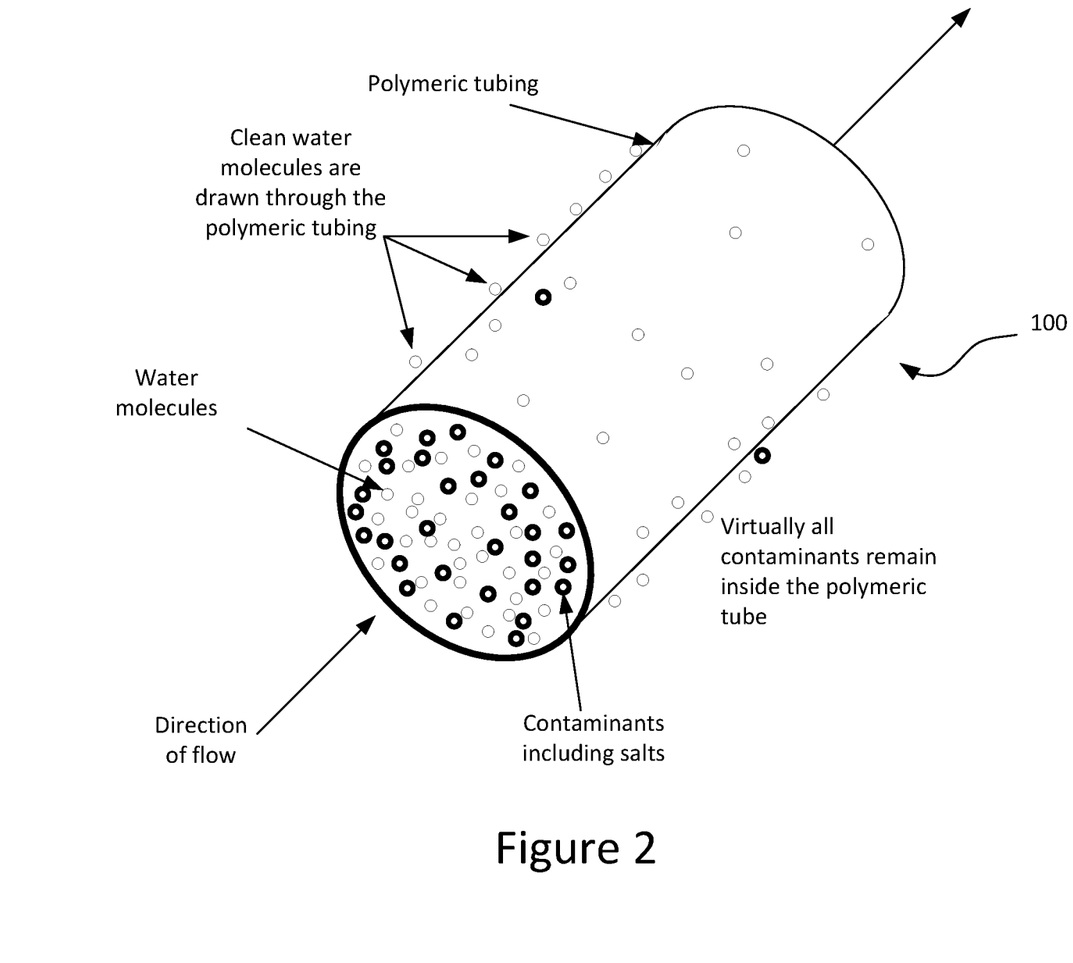
FIG. 2 illustrates one exemplary embodiment of a pervaporation type tube.
Figure 3:
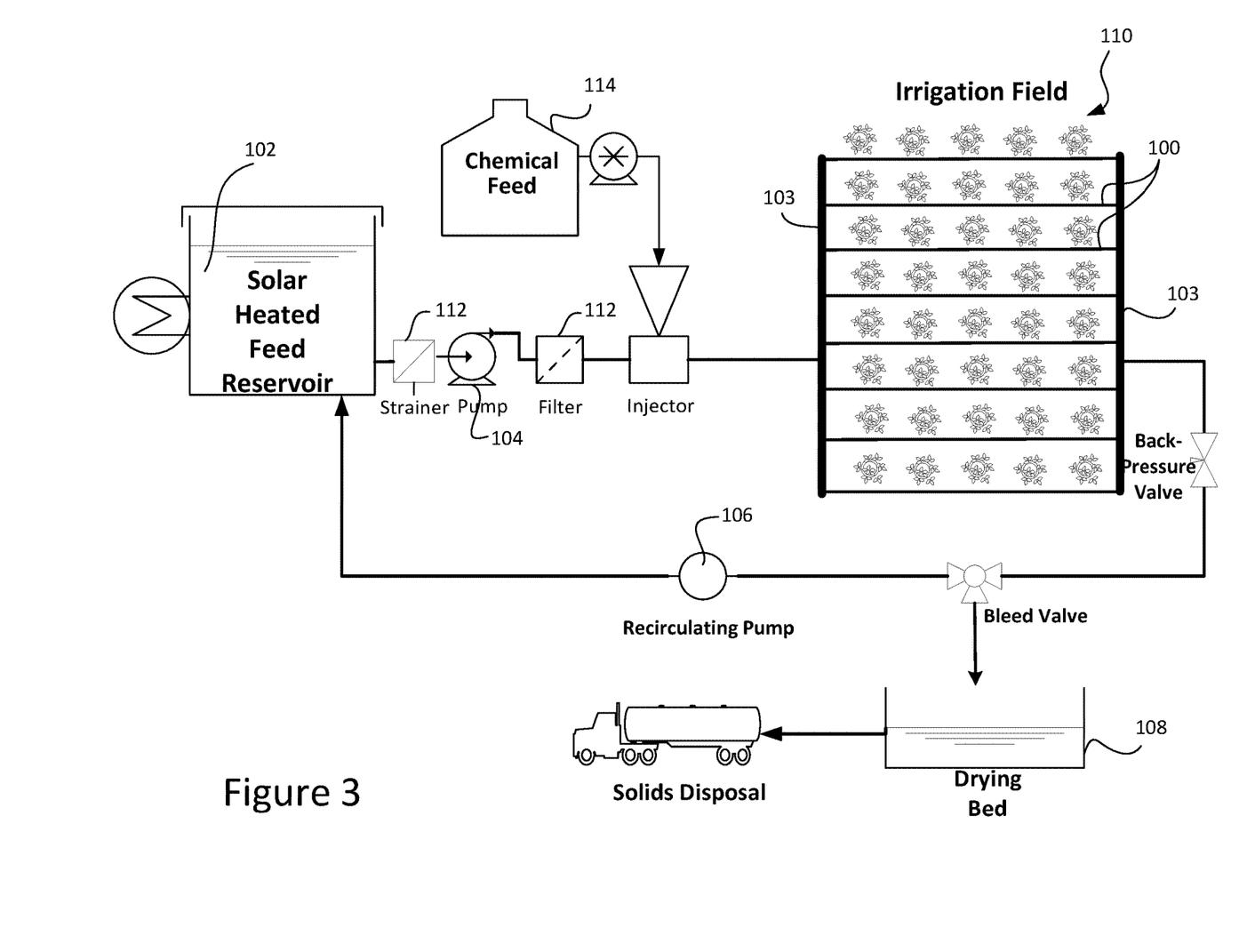
FIG. 3 illustrates a subsurface pervaporation irrigation system.

FIG. 2 illustrates one embodiment of a of a pervaporation membrane tube 100 that may be used in a Subsurface Desalination Irrigation (SDI) application. As shown, a pervaporation membrane is configured into small diameter tubing similar to conventional drip irrigation tubing or "tape." The tube 100 will be buried in the ground at a prescribed vertical depth and horizontal spacing between tubes in an irrigation field, depending on crop needs, soil characteristics and climate conditions. See FIG. 3. In general, the membrane tubes 100 will be laid out in a way similar to conventional subsurface drip irrigation systems. The network of tubes (e.g., irrigation field 110) will typically be connected by manifolds 103 and will be fed from a feed reservoir 102 of naturally saline or tainted water. Such a reservoir may include an above ground tank and may be solar heated. The system may rely on gravity and/or a pump 104 to feed water to the irrigation field. In some arrangements, a recirculating pump 106 may be included to cycle water through the system at a predetermined flow rate. In the case of a recirculating pump 106, the feed water may be returned to the reservoir 102 after passing through the irrigation field 110. That is, the tainted water may be recirculated through the irrigation field 110 until the water reaches a predetermined concentration, at which time the concentrated waste water (brine) may be disposed in, for example a drying bed 108 and/or via physical removal. Of further note, various strainers and/or filters 112 may be included to remove undissolved particulates from the water prior to passage through the membranes tubes 100. Such filter/strainers may reduce the potential for clogging of the membranes. Likewise, various chemicals 114 may be injected into the system to prevent, for example, scale build up in the tubing/membranes. That is, the system may require periodic flushing, which will be a function of the raw water chemistry, operating variables, etc. The flush water can be raw water (e.g., produced water from oil and gas operations, etc.) or some type of cleaning solution (e.g., acidic solutions, cleaning agents, etc.) to remove mineral scale, biofilms, etc. and to flush the membrane wall of ions that have penetrated into the membrane material matrix.

The SDI process allows for the use of water with high levels of dissolved solids (e.g., salts) for the irrigation of crops. One specific application is the use of waste water from produced wells, though this is not a requirement. Water is supplied to the soil much in the same way that high quality water is delivered to the soil by way of subsurface drip irrigation. The primary difference being that the irrigation tubing buried beneath the soil surface is comprised of a hydrophilic membrane material which allows for pervaporation of water into the soil without the concurrent transport of dissolved solids (e.g., salts). Water with elevated dissolved solids is effectively treated by the membrane tubes 100 before entering the soil. That is, water is transported across the membrane, from the tube interior containing the feed water to the surrounding soil environment or permeate side. This process is driven by, among other things, the vapor pressure gradient between the tube interior and the surrounding soil environment. The liquid water within the irrigation tube interior has a higher vapor pressure than does the unsaturated soil (containing primarily water vapor) that surrounds the pervaporation tube, i.e. water moves through the membrane from the wetter interior side of the tube to the drier soil side. In this system, the water vapor/condensate supplied to the soil is removed from the soil through two mechanisms: (1) uptake by plant roots and transpiration from plant stomata into the atmosphere during plant growth, and (2) evaporation from the soil surface into the surrounding atmosphere.

In concept, the Subsurface Desalination Irrigation (SDI) system is relatively simple. However, in practice, a working SDI system requires the ability to provide significant amounts of water for irrigation purposes. Along these lines, membrane flux rate (i.e., flow per unit area) to make a feasible system is significant. More specifically, previous pervaporative membranes have lacked adequate flux rates for commercially feasible subsurface irrigation systems. That is, prior membranes do not have adequate flux rates for high flow rate applications such as, but not limited to, SDI.

Aspects of the presented inventions are directed to membranes, suitable for non-pressure driven systems, having higher flux rates than prior pervaporation membranes. The membranes can be symmetric (i.e., having the same physical structure throughout the depth of the membrane) or asymmetric (i.e., having different physical structures through the depth of the membrane). Typically, the membranes have a hydrophilic active layer (i.e., active membrane) with thicknesses ranging from 10 nm to 200 microns. In various embodiments, the active membranes may be supported by a porous support. The active membranes are considered as being non-porous, in the traditional sense of the word used by membrane scientists, in that any opening through the matrix of the active membrane is generally less than about 10 nanometers (nm), which is approximately the distance between polymer chains in polymeric materials forming the matrix.

Figure 4A:
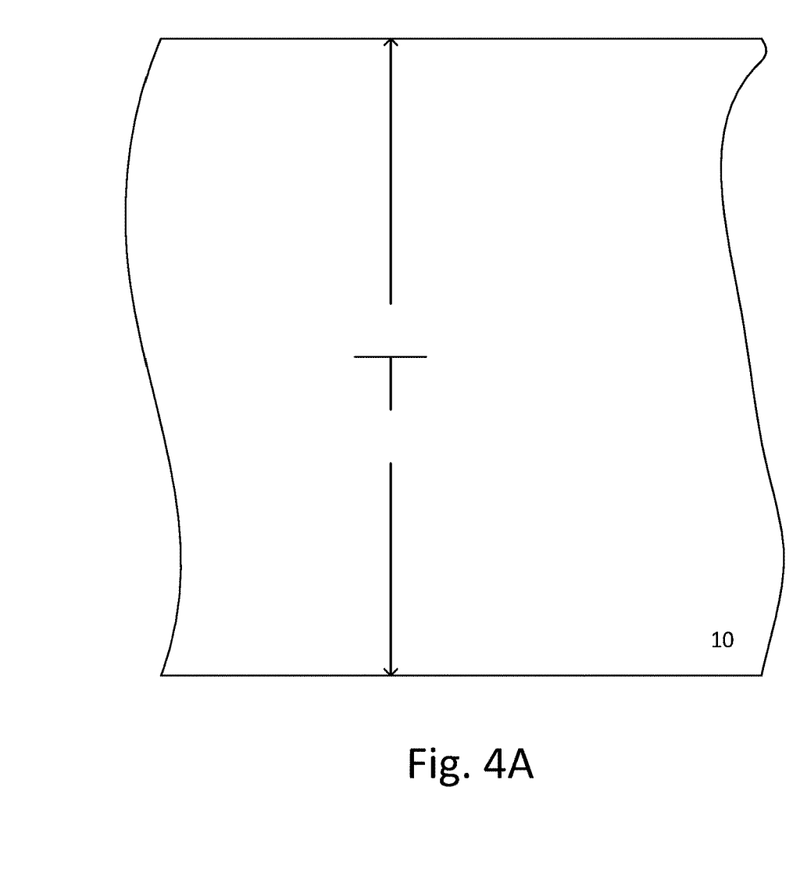
FIG. 4A illustrates a membrane cross-section.
Figure 4B:
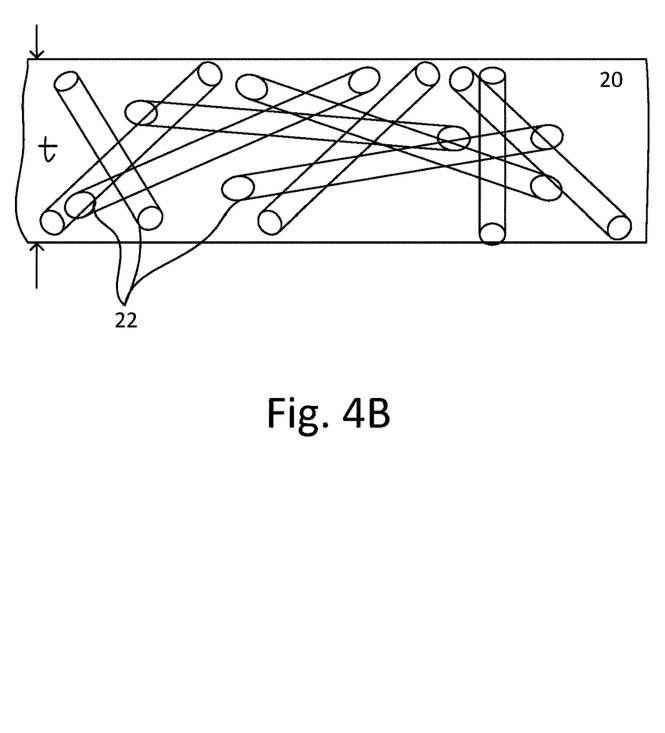
FIG. 4B illustrates a membrane cross-section with nanoparticles disposed with the matrix of the membrane.

In a first aspect, it has been recognized that reduction of the thickness of the active membrane results in exponential increases in the flux rate. However, below a certain thickness the materials that are utilized to form the hydrophilic/active membranes lack structural integrity and fall apart. FIG. 4A illustrates a cross section of a membrane 10 (e.g., active layer) formed entirely of a hydrophilic material. Such materials include, cellulose triacetate (CTA), cellulose acetate, polyvinyl alcohol (PVA) and modified polyamide (PA) to name a few. Various hydrophilic materials that permit permeation through the active membrane and its evaporation into the vapor phase may be used. To maintain structural integrity, the active layer membranes requires a minimum thickness. The thickness may be reduced if the active membrane is supported by a thicker and more porous support layer. If a support layer is not utilized, the thickness of the active membrane must be increased significantly. However, it has been recognized that, through the inclusion of nano-additives, the thickness T of the active/layer membrane may be significantly reduced. This is illustrated in FIG. 4B by membrane 20. As shown, the resulting nano-composite membrane 20 includes a plurality of nanoparticles 22 disposed within its matrix. Such nanoparticles 22 if elongated in shape act similar to glass fibers in a fiberglass matrix. In this regard, the nanoparticles 22 reinforce the matrix and thereby permit reducing the thickness 't' of the membrane 20 well below a thickness 'T' that is achievable utilizing a uniform hydrophilic material. For instance, such a nano-composite membrane 20 (i.e., matrix including nanoparticles) may have a thickness that is one-third or even one tenth of the minimum active layer thickness of an active layer made without additives, such as nanoparticles. Furthermore, the decrease in the thickness 't' of the nano-composite membrane 20 allows for an exponential increase in the water flux through the membrane 20.

In one embodiment, the nanoparticles disposed within the matrix of the composite membrane 20 are nanotubes. The nanotubes have a large length to diameter ratio (i.e., aspect ratio) and in many cases provide significant tensile strength, which works to increase the tensile and flexural strength of the polymer matrix for nano-composite membrane 20. Single and multi-walled carbon nanotubes, which are constructed entirely of carbon atoms and are thus naturally hydrophobic materials, represent the most widely studied type of nanotube structures. Imogolite nanotubes are characterized by dimensions that are similar to carbon nanotubes but are unique in terms of their elemental composition and surface chemistry. Imogolite is an aluminium silicate clay mineral with formula: $Al_2SiO_3(OH)_4$. The aluminosilicate mineral imogolite is composed of single-walled nanotubes with stoichiometry of $(HO)_3Al_2O_3SiOH$ and occurs naturally in soils of volcanic origin. Though naturally occurring, such imogolite nanotubes can be lab produced. In this regard, the diameter of the pore opening and length of the tubes may be controlled, as well as their surface chemistry modified through the attachment of functional groups. The imogolite nanotubes provide one important benefit in the creation of a composite active membrane. Specifically, the imogolite nanotube are themselves hydrophilic. Accordingly, when the nanotubes are disposed within the membrane matrix material during formation of the nano-composite membrane, the nanotubes more readily disperse. That is, hydrophobic nanotube materials, such as carbon nanotubes, tend to clump during their insertion within the matrix. Though the more hydrophilic imogolite nanotubes more readily disperse, clumping remains a problem. To alleviate such clumping, the outside surfaces of such nanotube materials may be coated with a hydrophilic group coating. Such hydrophilic groups include, without limitation, carboxile, amonnium and aromatic rings. As further discussed herein, the interior of the imogolite nanotubes may be made hydrophobic in order to realize improved water transport by reducing water adhesion to the interior walls of the nanotube.

Figure 5:
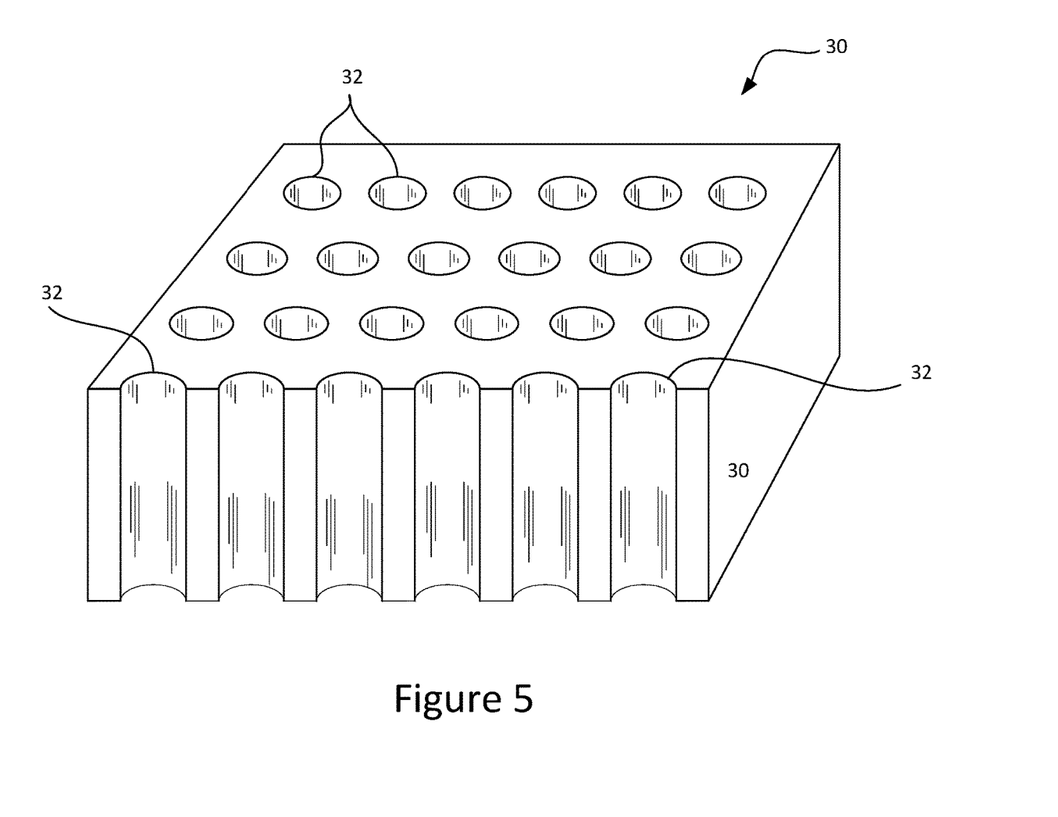
FIG. 5 illustrates a membrane with aligned nano-tubes.

In another aspect, the flux of an active layer membrane is increased by utilizing aligned nanotubes. This is illustrated in FIG. 5 which shows a plurality of nanotubes 32 disposed within the matrix of a membrane 30. As shown, each of the nanotubes extends through the matrix from a top surface to a bottom surface. In this regard, the pores/throats of nanotubes define pathways through the membrane. In one embodiment, the nanotubes are imogolite nanotubes due to their ability to be controllably manufactured.

The synthesis procedure for imogolite nanotube typically involves the controlled hydrolysis of aluminum together with silicon or germanium precursors. The choice of aluminum precursor compounds which can be used for the synthesis include aluminum salts such as chloride/nitrate/perchlorate as well as organic compounds such as aluminum isopropoxide. The typical Si/Ge precursors used tend to be alkoxides (tetraethoxysilicate, germanium ethoxide). The precursor solutions are hydrolyzed slowly using NaOH solution until a certain desired pH is achieved or until a certain hydrolysis ratio [OH]/[Al] is reached. The resultant solution is often acidified to a pH of 5 using $HO/CH_3COOH$. The hydrolysis step results in the formation of protoimogolites which transform into the imogolite nanotubes upon heating. The growth of the nanotubes continues due to tip-tip collisions. The [Al]/[Ge] ratio currently used is about 2. The initial concentration of the aluminum determines if single walled (SW) or double walled (DW) nanotubes. Higher initial concentrations of [Al] favor the formation of SW nanotubes. The length of the imogolite nanotubes achieved by this synthesis method is limited to 200 nm for SW tubes and <100 nm for DW nanotubes.

A slight modification in the imogolite synthesis procedure enables making the Al/Ge imogolite nanotubes significantly longer. Instead of the slow hydrolysis of the Al and Ge precursor solutions the new method involves the addition of a pre-determined amount of urea instead. The solution is placed in a pressure device and heated in an oven to about 140° C. for 5 days. The slow thermal decomposition of the urea produces the hydroxyl ions in situ which hydrolyzes the aluminum and germanium precursors. The maximum length of the nanotubes achieved via this new method were up to 2.5 µm. The resultant solution with nanotubes (after 5 days) is cooled and dialyzed with ultrapure water using 8 kDa dialysis membranes. Though possible to make longer imogolite nanotubes, the imogolite nanotubes can be made in lengths as short as 10 nm. Generally, shorter nanotubes will be used for aligned nanotube active membranes while longer nanotube membranes will be used for mat-type composite membranes (e.g., FIG. 4B).

Precursors other than silica/germanium may also be utilized to increase the opening diameter for the resulting nanotubes. The opening is larger for the germanium precursor (~4 nm) than that for the silica precursor (~2.5 nm). Different precursors allow creation of nanotubes with throat/pore diameters up to 10 nm in order to optimize water transport through the nanotubes having hydrophobic coatings on the throat surface.

Figure 6:
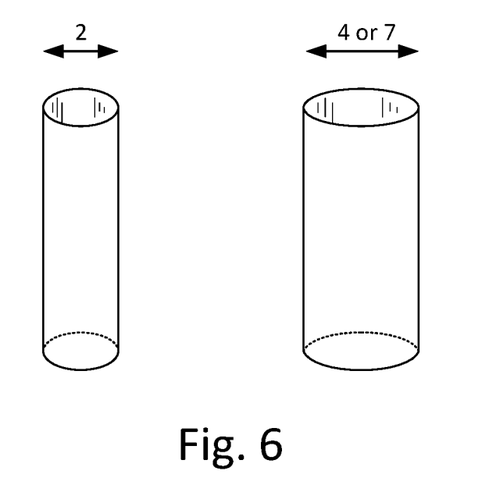
FIG. 6 illustrates variation in nano-tube diameter.

Altering the pore/throat size of the nanotubes alters the manner in which water passes through the membrane. For instance, as shown in FIG. 6, nanotubes having a throat diameter of around 2 nm or less result in permeate passing through the membrane in a solution diffusion arrangement. That is, molecular transport is required across membrane.

For nanotube's having a throat diameter of 4 nm or larger, the membrane is less reliant on solution diffusion. Maintaining a diffusion aspect, the membrane functions closer to that of an ultrafiltration membrane. That is, water percolates through the throat/pore of the nanotubes.

While increasing the flux rate across the membrane, the percolation of water through the nanotubes could allow the passage of salt ions across the membrane. To alleviate such passage of undesired ions, the ends of the nanotubes 32 exposed to the fluid incorporate a hydrophobic coating 36. See FIG. 7. Hydrophobic functional groups that may be utilized provide a coating on the end of the nanotubes include methyl groups. Currently methyl (R—CH3) groups are used for coating the nanotubes. However, other hydrophobic coatings (e.g., other low molecular weight hydrophobic groups) are possible and within the scope of the presented inventions.

Figure 7:
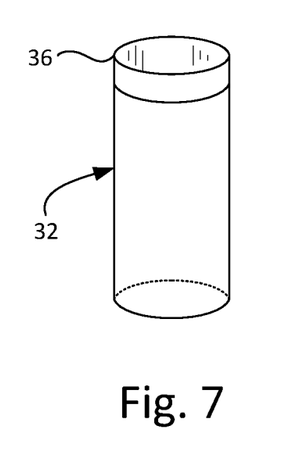
FIG. 7 illustrates addition of a hydrophobic coating to an end of a nano-tube.
Figure 8:
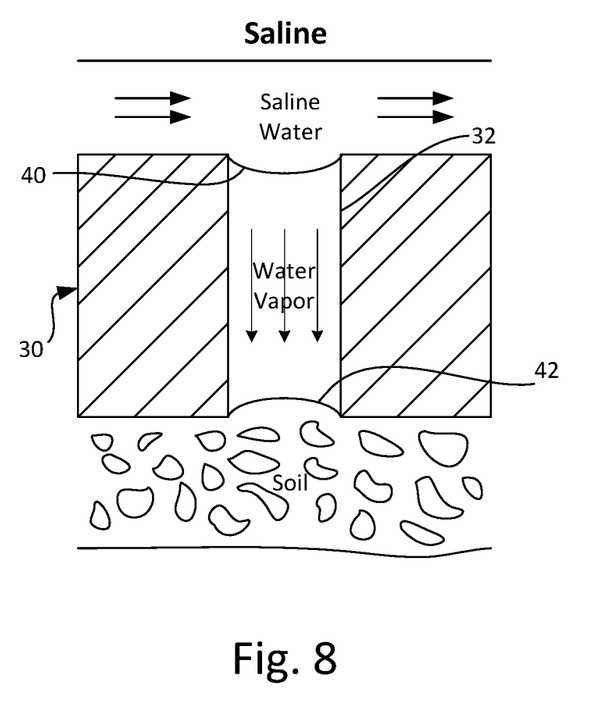
FIG. 8 illustrates a cross-section of an aligned nanotube membrane sidposed in soil.

The hydrophobic coating 36 on the ends of the nanotubes 32 prevents water from percolating directly into the open throats of the nanotubes. Rather, water must vaporize to pass through the hydrophobic coated ends of the nanotubes. In this regard, a concave meniscus or liquid vapor interface 40 forms across the open throat of the nanotube. This is illustrated in FIG. 8, which illustrates the active membrane 30 disposed between a source of saline water and soil. However, it will be appreciated that the soil is shown for purposes of illustration and not by way of limitation. The membrane may be utilized in other applications. Once the water vaporizes and enters into the throat, the passes through the nanotube 32 where it may condense at a second interface 42.

In addition to coating the end of the nanotube with a hydrophobic material, a further embodiment of the presented inventions includes coating the interior of the nanotube with a hydrophobic material. In this regard, the same material that coats the end of the nanotube may be utilized to coat the interior. Coating of the interior of the nanotube with a hydrophobic material provides a number of benefits for the active membrane. One benefit is that the hydrophobic coating reduces the friction of the water vapor within the poor increasing the flux rate across the membrane. Another benefit as the water vapor is repelled by the interior walls of the nanotube, the water vapor cannot build up or accumulate on the walls, which may result in the formation of water droplets. If a water droplet forms within the nanotube, the nanotube may become flooded and permit water and included ions to pass through the nanotube. Similar flooding can occur within non-permeable or uniform membranes. That is, in a uniform membrane matrix (i.e., without nanotubes) water vapor works through a tortured path in the spaces between the polymer chains and can become trapped within the membrane. Such trapped vapor may accumulate and form water drops allowing for flooding across the membrane. Use of the hydrophobic coating reduces or substantially eliminates such flooding.

In an embodiment where imogolite nanotubes are utilized, the use of this material provides a further benefit. Specifically, imogolite nanotubes are rigid. In this regard, such nanotubes can be manufactured with near uniform lengths and provide direct paths through the membrane 30 for water vapor. For instance, carbon nanotubes, which could be coated on their interior with a hydrophobic material, are typically long and limp more like a string or noodle. In such an arrangement, such long non-rigid nanotubes do not provide a direct path through the membrane and may provide locations where water vapor could accumulate.

In addition to coating an end of the nanotubes with a hydrophobic material to prevent percolation of water through the nanotubes, cation selective coatings may be applied to the nanotubes and/or for inclusion within the matrix. A cation selective material reject cations (e.g., calcium, sodium, magnesium) while allowing anions (e.g., phosphate, nitrate; plant nutrients) to pass through. The intent with using a cation selective membrane is that fertilizer could be delivered directly to the root system of plants. With such an arrangement, cations such as sodium would not pass into the soil and thus not negatively affect the sodium adsorption ratio (SAR) or the exchangeable sodium percentage (ESP) of the soil. Because this process will occur in the absence of an applied electrical field, such as in electrodialysis, the physical (e.g., MWCO) and surface chemical (e.g., surface charge, polymer type) properties of the nanotubes and/or membranes will be tailored to select for cation rejection and anion passage. Because phosphate and nitrate can exist in a multitude of forms in a solution, which is a function of solution chemistry (namely pH), control of the form of the molecules is provided through manipulation of the solution chemistry.

Generally, two methods are currently available for forming an aligned nanotube active membrane. The first method is magnetic field alignment, where a magnetic metal is attached to ends of tubes such that they may be aligned in magnetic field. Once aligned, the nanotubes may be flooded with a polymer matrix. At this time, magnetic metal may be washed off in an acid bath.

Figure 9:
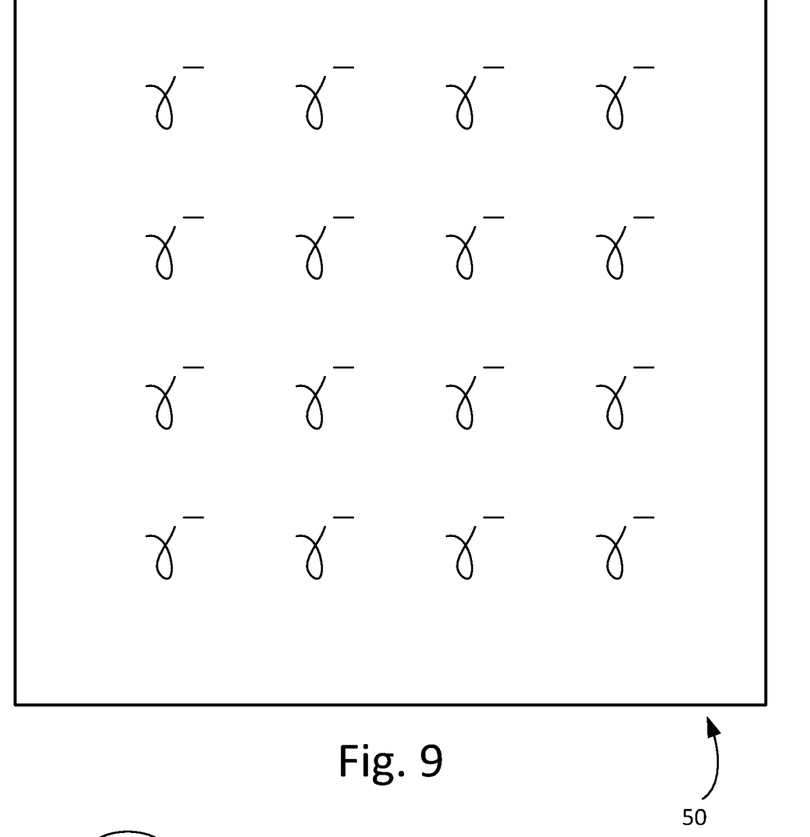
FIG. 9 illustrates a template for use in aligning nan-tubes.
Figure 10:
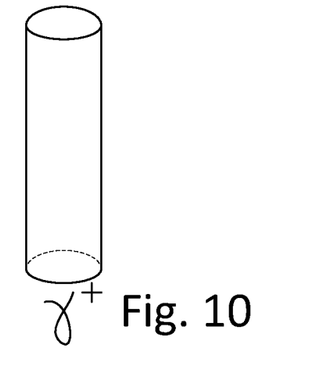
FIG. 10 illustrates a nano-tube functionalized with donor molecules.
Figure 11:
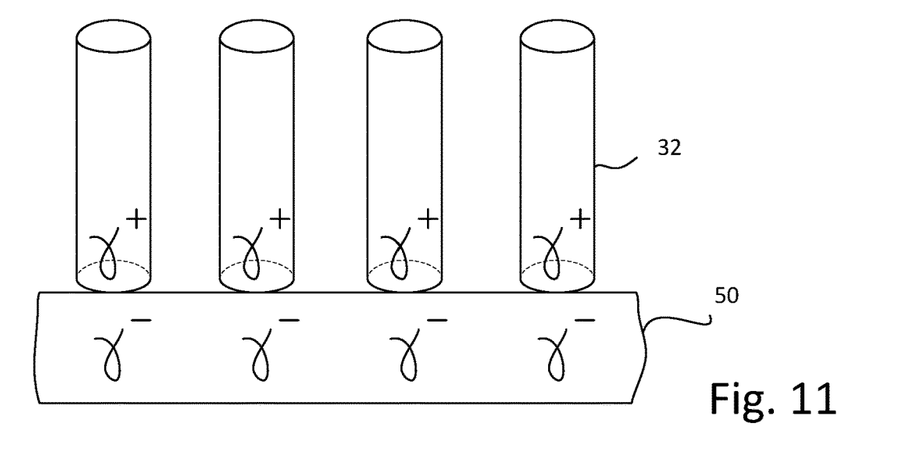
FIGS. 11-13 illustrate a process for forming a membrane with aligned nano-tubes.
Figure 12:
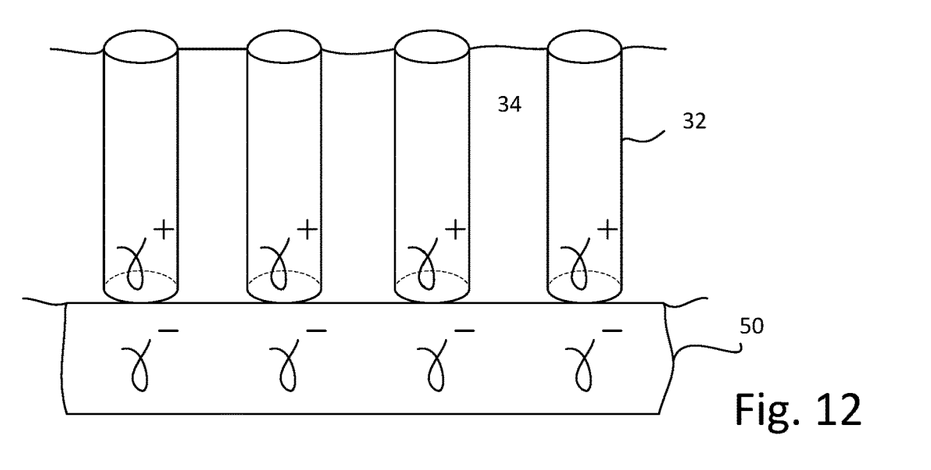
Figure 13:
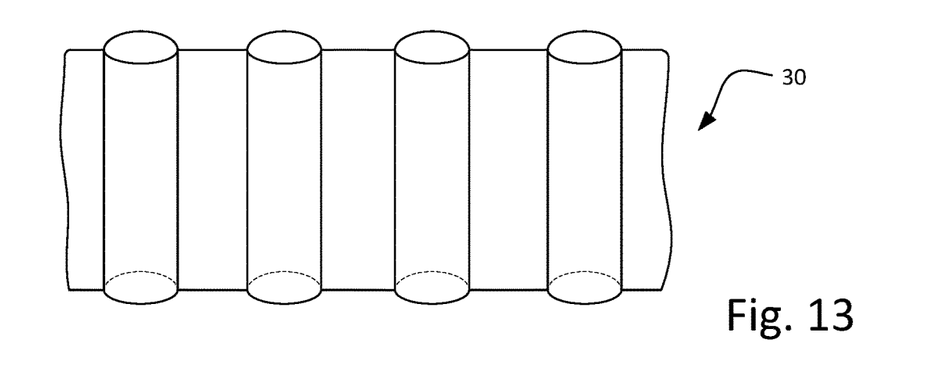

In another method for forming an aligned nanotube active membrane, imogolite nanotubes are aligned using donor-acceptor reactions. In this method a templated surface 50 is formed that is composed of patterned (set spacing between molecules) acceptor molecules. See FIG. 9. The ends of the imogolite nanotubes will be functionalized with donor molecules. See FIG. 10. The templated surface 50 is immersed in a solvent (e.g., water) after which the donor charged nanotubes are dispersed into the solvent. Following the donor-acceptor reactions the nanotubes will form an aligned forest in which the nanotubes are substantially perpendicular to the template. See FIG. 11. The suspending fluid will then be exchanged with the polymer matrix 34 that will form the active layer of the membrane. See FIG. 12. Once the polymer matrix 34 sets, the resultant membrane 30 may be removed from the template 50.

Of note, the matrix material is typically a hydrophilic material. However, other materials may be utilized. For instance, hydrophobic materials such as polypropylene or PDVF could be utilized as the matrix. In this regard, the active membrane would rely entirely on vapor passing through the aligned nanotubes. Such an arrangement may provide an active membrane that has increased environmental resistance.

As noted above, the active layer (either nano-composite or aligned tube) may be provided alone or may be incorporated onto a support structure and used to form a tube (e.g., for subsurface irrigation). See e.g., FIG. 2. In one embodiment, the tube is composed of only the nanocomposite membrane material. The thickness of the membrane will be between 200 microns and 1 mm. The thickness of the membrane will be determined by the mechanical properties of the resulting film. For example, the membrane must be able to withstand the overburden pressure of relevant soils, line pressure from the water, and punctures from rocks etc. in the soil.

Figure 14:
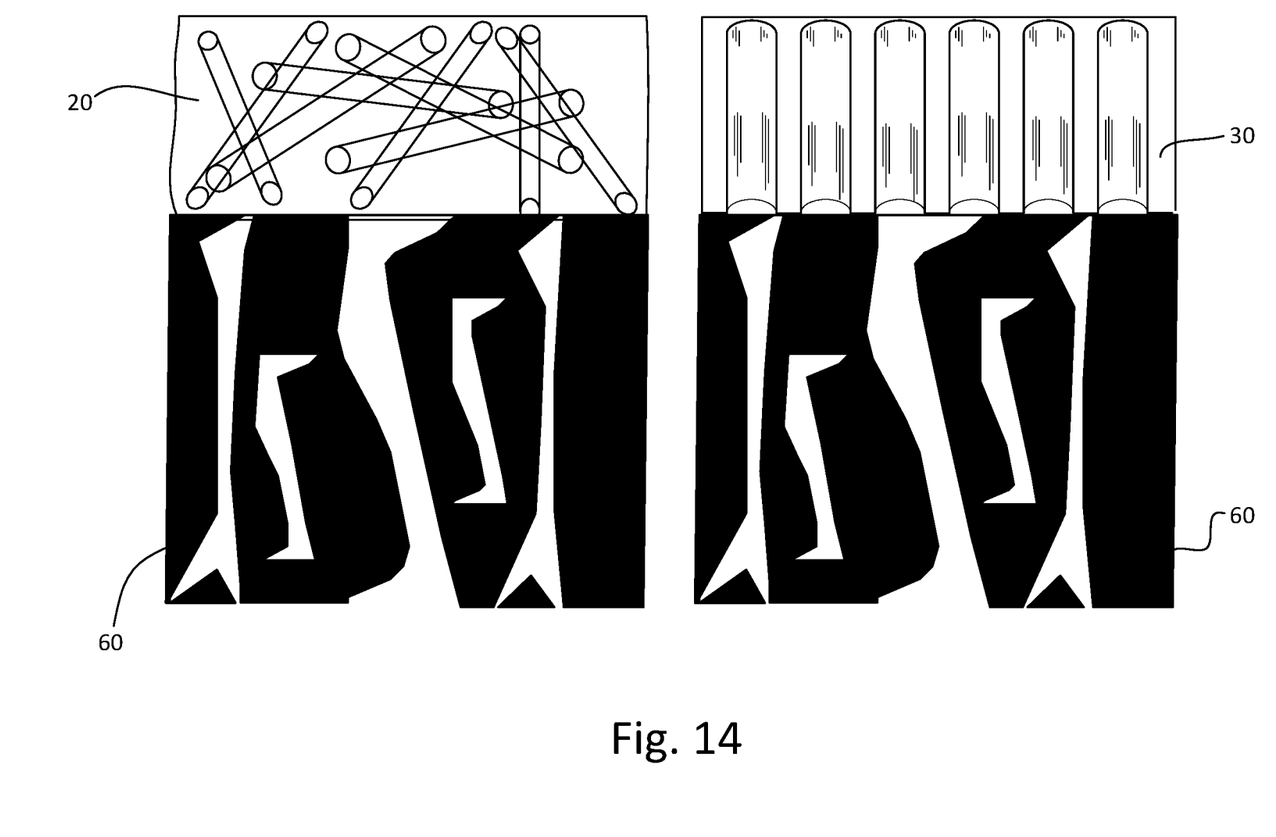
FIG. 14 illustrates nano-particle membranes attached to a macroporous support layer.

In another embodiment, a tubular membrane is constructed of a macroporous hydrophobic support 60 and a hydrophilic active layer 20 or 30. See FIG. 14. The hydrophobic support will be manufactured of polypropylene or another hydrophobic material. The hydrophobic nature of the support will minimize condensation on the posterior side of the membrane in soil applications. This will maintain a high vapor pressure gradient across the membrane, which is a function of the moisture content in the immediate vicinity of the membrane. Pores having a nominal diameter of less than 0.8 and more preferable about 0.2 microns will be integrated into the support to allow for high vapor transport from the active layer, while preventing flooding of the pores under saturated soil conditions. The size of the pores will also prevent the intrusion of soil and particulates into the membrane material matrix.

The hydrophilic active layer being attached to a macroporous support layer provides a number of benefits. In this configuration the active layer can be thinner than in a configuration without a support. A thickness of less than 100 nm, less than 50 nm or even less than 20 nm is preferred to increase flux rates. This can be done because the active layer is protected from the soil environment and the matrix of the membrane is reinforced with nano-particles. The support layer will protect the active layer from chemical and physical attack from elements in the soil (pH, puncture from debris, etc.). Because the support layer is hydrophobic and the nominal pore size is less than 0.8 microns, water will be unable to contact the active layer of the membrane in liquid form. In other words this design will prevent diffusion of water from the soil (e.g., if the soil were to become saturated) into the interior of the tubular membranes. The macroporous structure will allow water to travel from the permeate side of the membrane into the surrounding soil in vapor form. This is the same mechanism that is used in membrane distillation. Candidate polymers for the support layer are polypropylene and PVDF. Other polymers are possible.

As noted, subsurface pervaporation type irrigation utilizes tubular, semipermeable, and hydrophilic membrane materials in place of conventional drip tape. For use in such subsurface irrigation, water flux passing through the membrane has been determined to be a function of the membrane properties (thickness, hydrophilicity) and environmental variables (vapor pressure gradient, soil texture, soil clay content). Generally, fluxes increase as the water vapor pressure in the soil adjacent to the membrane decrease. The total soil water potential and its specific components, the matric potential and osmotic potential, also influence the flux. For instance, it is noted that clayey and peaty soils have a lower matric potential than sand for the same soil water content, which translates to a lower vapor pressure and hence higher flux for clayey/peaty soils. Further, it has been determined that water flux increases with decreasing humidity in the soil.

Studies have examined the performance of a pervaporation type membranes in a soil box examined membranes buried in two types of soils (a loam soil and a loamy sand) where a desiccant was used to simulate a plant root (a water sink). Flux was determined to be inversely proportional to the soil moisture content. Higher fluxes measured in the topsoil were credited to the topsoil's ability to adsorb more water relative to the sand. Water adsorption by the soil drew the moisture away from the membrane and, in turn, created a higher vapor pressure gradient.

Further studies by the inventor have evaluated the inter-relationships between flux, membrane properties, and moisture transport in the soil as applied to the desalination performance of a subsurface pervaporation irrigation process. The properties investigated included the soil type (soil texture, clay content, hydraulic conductivity), soil volumetric moisture content in the immediate vicinity of the tube (vapor pressure gradient), and membrane hydrophilicity. The results from the subsurface soil pervaporation experiments were compared with simulations done using a HYDRUS-2D model to better understand the movement of moisture within the soil. The soil moisture content within the wetted zone around the pervaporation membrane was analyzed to determine the feasibility of the irrigation membranes to practically irrigate crops.

Figure 15:
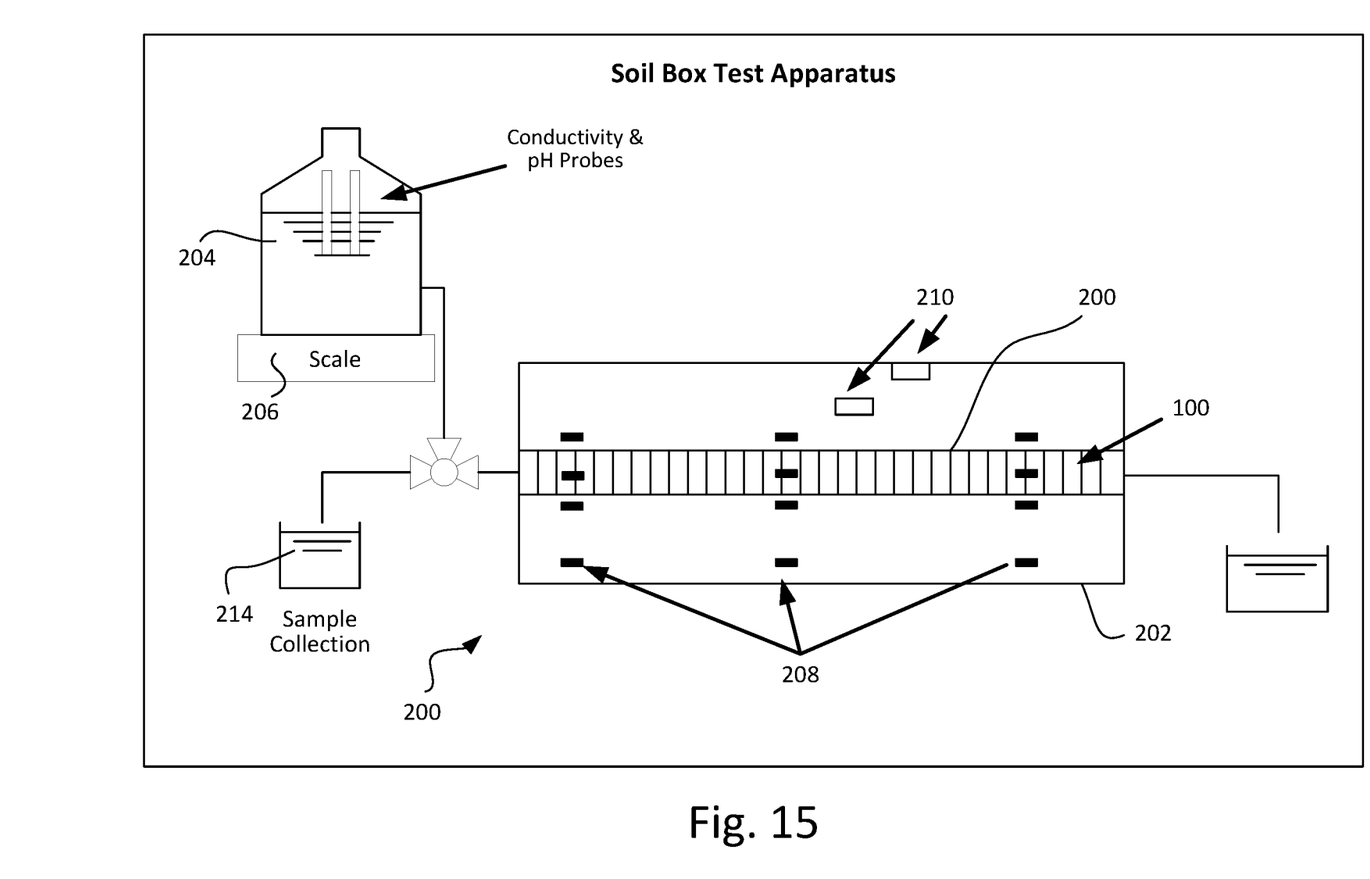
FIG. 15 illustrates a soil box test apparatus.

Subsurface pervaporation irrigation tests were conducted using different commercially available pervaporation membranes. The first was a polyether ester (PEE) membrane manufactured by Du Pont (de Nemours, Geneva). The tubular PEE membrane (diameter=2.14 cm and 250 µm thickness) is nonporous and hydrophilic. The second membrane was a cellulose triacetate (CTA) membrane supplied by Hydration Technology Innovations (Albany, Oreg.). The CTA membrane is a composite membrane with an embedded polyester mesh for mechanical support. The active layer (CTA) thickness was ~10 µm. A schematic of the irrigation test apparatus 200 used in this study is shown in FIG. 15. The total depth of the box 202 was 30 cm, with 10 cm of headspace (headspace volume=0.13 m3) within the box 202. The tubular membranes 100 (PEE length, l=1 m, cross-sectional area, Ax=1.103 $m^2$ or CTA l=0.91 m, Ax=0.0828 $m^2$) were attached to watertight fittings inside the box, at a depth of 10 cm from the box bottom, and surrounded by 0.25 $m^3$ of soil (total soil height was 20 cm from the bottom of the box to the top of the soil). An airline (not shown) was used to circulate dry air through the box (lL/min) to maintain the RH in the box at <2%. Soil types used in the experiments included silica sand garden soil and a clay loam soil. The silica sand was Grade No. 20 with a particle diameter range of 0.45-D.55 mm. The initial water content of the sand was 0.05 $m^3/m^3$. The clay loam soil comprised ~30% sand, 30% silt, and 40% clay. It had an initial water content of 0.08 $m^3/m^3$. The garden soil used in the tests was obtained from Miracle-Grog (Marysville, Ohio). It is a blend of organic materials, sphagnum peat moss, and nutrients. The initial water content of the garden soils used in the tests varied between 0.05 and 0.11 $m^3/m^3$. The soil water retention properties for the sand and the clay loam were taken from the HYDRUS-2D database for standard sand and clay loam soils. These soil properties were used to calculate the vapor pressure of water in the soil, which in turn were used to calculate the vapor pressure gradient, experienced by water in the pervaporation tube placed in a soil medium and the specific pervaporation flux.

The feed water tank 204 was placed on a mass balance 206 so that the flux could be calculated as a function of time (change in mass over time). The feed tank was placed at an elevation above the tubing to provide positive water pressure relative to the atmosphere (~2.8 kPa) inside the membrane tubing 100. Twelve soil capacitance probes 208 were placed within the soil box 202 at various depths and distances from the membrane tubing 100 to monitor soil moisture content, electrical conductivity (EC), and temperature. Probes 210 were also placed in the headspace within the box to measure the temperature and RH of the air above the soil. One probe was attached to the lid of the box, and the other probe was placed on the soil surface. Samples were periodically drawn from inside the tubular pervaporation membranes using the sample collection port 214. The EC of the drawn samples was measured to calculate salt rejection. In select tests with the clay loam soil, the feed water was recycled through the tubular membrane using a peristaltic pump to study the effects of mixing on membrane performance.

Results of the tests showed that both membranes rejected salt and that the specific flux for the CTA membrane was four (4) times that for the PEE membrane under the same environmental conditions and using the same feed solution over the respective test durations. The higher water flux that was measured for the CTA membrane agrees with earlier results for flat-sheet PEE and CTA membranes and is attributed to the thinner active layer for the CTA membrane (10 μm vs. 250 μm). Generally, the tests showed that, for similar or identical soil conditions, a thinner active layer increases the water flux of a membrane.

The driving force for water transport is thus a combination of the difference in pressure heads between the water inside the tubular membrane, the soil matric potential, and a difference in vapor pressure between the soil and feed water inside the tubular membrane. The matric suction for dry soils (volumetric water content, R<10%) can range from 10 kPa for sandy soils to 100,000 kPa for clayey soils. Results from dead-end filtration experiments have shown that a hydraulic pressure of 1,750 kPa was required to achieve water transport across a 20-μm-thick PEE membrane in the absence of a vapor pressure gradient. A hydraulic pressure of just 350 kPa was enough to achieve permeation across the CTA membrane. Thus, some soils can provide the necessary vapor gradient to transport water across a pervaporation type membrane depending on the properties of the membrane.

The results of the tests also showed that the rate at which the water permeates across the membrane is directly proportional to the vapor pressure gradient existing across the membrane barrier. The flux should theoretically decrease with time as the volumetric moisture content increases in the soil immediately surrounding the membrane (as water permeates across the pervaporation tubing into the surrounding soil). Moisture present in the soil though is not stationary and is conducted across the soil (hydraulic conductivity). This property, which redistributes the moisture across the entire soil profile, helps in maintaining a relatively constant moisture content in the soil near the membrane. This in turn maintains a sufficient vapor pressure gradient, which serves as the driving force for continued water permeation across the membrane. This redistribution effect is assisted with the presence of plants, which act as a water sink, which in turn would result in the formation of a steady-state water potential gradient between the water inside the non-porous salt rejecting tubing and the surrounding soil.

The tests suggest that subsurface pervaporation type membranes could be suitable for meeting the water demands of select crops under appropriate climatic and soil conditions. For example, the maximum evapotranspiration rate/water demand for crops such as alfalfa, cotton, and castor beans is between 0.8 and 1 mm/day in a loamy sand. This range in values translates into a water application rate range of 0.8-1.0 L/day per square meter of land. The average flux values measured for the PEE membrane in clay loam was 0.39 L/[m$^2$·day], while the flux for the CTA membrane in clay loam was 2.74 L/[m$^2$·day]. Based on the surface area/unit length of the CTA membrane (0.0828 m$^2$/m), this would require 5.4 m of the CTA membrane for a 1 m$^2$ plot of soil generally characterized as clay loam to meet the daily water demand of any of the above-mentioned crops. Similarly, using the surface area/unit length value for the PEE membrane (1.103 m$^2$/m), we would require 34 m of the PEE membrane in clay loam to provide the necessary water for the above-mentioned crops in a 1 m$^2$ plot. This example scenario is based on a number of assumptions and represents areas of ongoing research. However, in either case utilizing existing membranes, the length of tubing required for subsurface irrigation makes such systems impractical. For instance, it may be desirable to use no more than a 2 m length of a subsurface pervaporation type tubing to irrigate a 1 m$^2$ plot of soil and may be more desirable to use a 1 m length of a subsurface pervaporation type tubing to irrigate a 1 m$^2$ plot of soil.

Accordingly, it has been determined that providing a practical and effective subsurface pervaporation type irrigation, in a non-pressure or low-pressure system and which allows for using saline water as a feed source, with all other variables being equal, requires significantly thinning the active or salt separating layer of the pervaporation membranes to increase the specific water flux rate (L/m$^2$/day/Pa), or the water flux normalized to the net driving force, and water delivery to plant roots. As discussed above, the mechanical strength of polymeric thin-films weakens below a certain thickness. This in turn reduces the ability of the membrane to maintain its integrity during operation thereby setting a minimum thickness for the active layer. Along these lines, it the active layer of the CTA membrane for which results were previously discussed was approximately 100 nm while that for the PEE membrane was roughly 250 μm—a difference of three orders of magnitude. As noted above in relation to FIG. 4, the inclusion of nano-fillers/particles 22 into a matrix of a hydrophilic material allows for producing membranes that are as thin a 10 nm. Accordingly, a CTA membrane that is one-fourth to one-tenth the thickness of the membrane discussed allows production of subsurface pervaporation tubing that is adequate to provide irrigation water to plant roots from tainted or saline water without utilizing excessive amounts of tubing.

While the inclusion of nano-fillerss may be done with cellulose triacetate (CTA), it is presently believed that superior results may be achieved using polyamide and cellulose acetate materials. These materials are utilized, in one example, with imogolite nano-tubes where the imogolite nano-tubes comprise at least 2%-3% (by weight) of the resulting nano-composite membrane. In such an arrangement, the nano-tubes typically form approximately 15% of the surface area of the resulting membrane. Further, tests using such concentrations of imogolite nanotubes in a PVA matrix has shown that the resulting composite PVA membrane has an increased flux rate in comparison with a pure PVA membrane of a common thickness. Some results shown the composite PVA-imogolite nanotube membrane has a flux that is 13-18% greater that the pure PVA membrane of same thickness. That is, inclusion of the nano-tubes increases the flux rate of the membrane. These nano-tubes also increase the mechanical strength of the membrane.

Though the thickness of the membranes is a significant factor in water transport for subsurface irrigation, it should be noted that any system design for a subsurface irrigation system remains a combination of the difference in pressure heads between the water inside the tubular membrane, the soil matric potential, and a difference in vapor pressure between the soil and feed water inside the tubular membrane. Accordingly, any method of using or laying out a system is a complex interaction between the soil conditions and the membrane properties. Stated otherwise, the layout/design of a system is dependent on soil conditions as well as the evapotranspiration rate/water demand for crops. Such interrelation between the crop needs, soil conditions, membrane properties and/or length/diameter of subsurface tubing for a given area of irrigation is considered novel in and of itself.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A subsurface irrigation system using saline or tainted water for irrigating crops, comprising:
   a source of saline water;
   a plurality of spaced membrane tubes buried within soil of an irrigation field, wherein said plurality of spaced membrane tubes are fluidly connected with said source of saline water, each of said plurality of spaced membrane tubes including:
      a non-porous tubular active layer formed of:
         a hydrophilic material, said hydrophilic material having a thickness of between 10 nm and 200 nm between a first inside surface and a second outside surface; and
         nanoparticles disposed within said hydrophilic material, wherein said non-porous tubular active layer permits diffusion of water between said inside surface and said outside surface substantially free of salts within said saline water; and
      a macro-porous tubular support layer disposed about said outside surface of said non-porous tubular active layer, wherein said macro-porous support layer is formed of a hydrophobic material having pores with a nominal pore size of less than 0.8 microns; and
   a pump for circulating said saline water through said plurality of spaced membrane tubes.

2. The system of claim 1, where said nanoparticles comprise nanotubes.

3. The system of claim 2, wherein said nanotubes have a length between 10 nm and 200 μm.

4. The system of claim 2, wherein said nanotubes have a pore diameter between about 1 nm and about 10 nm.

5. The system of claim 2, wherein said nanotubes are randomly oriented within said hydrophilic material.

6. The system of claim 2, wherein said nano-tubes comprise at least 2% by weight of a total weight of said non-porous tubular active layer.

7. The system of claim 2, wherein said nano-tubes comprise at least 10% of said inside surface of said non-porous tubular active layer.

8. The system of claim 1, wherein said hydrophilic material comprises one of:
   cellulose triacetate (CTA);
   cellulose acetate;
   polyvinyl alcohol (PVA); and
   modified polyamide (PA).

9. The system of claim 1, wherein said plurality of spaced membrane tubes are spaced as a function of a diameter of said non-porous tubular active layer, a flux rate of said non-porous tubular active layer, a matric potential of the soil and an evapotranspiration rate of crops planted in the soil to provide a desired water application rate for the crops.

10. The system of claim 7, wherein said diameter and flux rate of said non-porous tubular active layer are selected to provide said desired water application rate with less than 2 meters of tubing per square meter of land in said irrigation field.

11. A membrane for use in separating dissolved impurities and solids from water, comprising:
   a non-porous tubular active layer formed of a hydrophilic material, said non-porous tubular active layer having a thickness of between 10 nm and 100 nm between a first inside surface and a second outside surface of said tubular active layer; and
   nanoparticles disposed within said active layer, wherein said nanoparticles have an aspect ratio of a length to width of at least 5:1; and
   a macro-porous tubular support layer disposed about said outside surface of said non-porous tubular active layer, wherein said macro-porous support layer is formed of a hydrophobic material having pores with a nominal pore size of less than 0.8 microns.

12. The membrane of claim 9, where said plurality of nanoparticles comprises nanotubes.

13. The membrane of claim 10, wherein said nanotubes have a length between 10 nm and 200 μm.

14. The membrane of claim 11, wherein said nanotubes have a pore diameter between about 1 nm and about 10 nm.

15. The membrane of claim 10, wherein said nanotubes are randomly oriented within said active layer.

16. The membrane of claim 10, wherein an interior of said nanotube comprises a hydrophobic coating.

17. The membrane of claim 10, wherein said nanotubes are substantially rigid cylindrical members.

18. The membrane of claim 15, wherein said nanotubes are substantially aligned in said active layer.

19. The membrane of claim 16, wherein at least a portion of said nanotubes extend from said first inside surface to said second outside surface.

20. The membrane of claim 17, wherein at least a portion of said nanotubes define substantially straight passage between said first inside surface and said second outside surface.

* * * * *